US008484028B2

(12) United States Patent
Carter et al.

(10) Patent No.: US 8,484,028 B2
(45) Date of Patent: Jul. 9, 2013

(54) SYSTEMS AND METHODS FOR DOCUMENT NAVIGATION WITH A TEXT-TO-SPEECH ENGINE

(75) Inventors: Scott Carter, Los Altos, CA (US); Laurent Denoue, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1035 days.

(21) Appl. No.: 12/258,303

(22) Filed: Oct. 24, 2008

(65) Prior Publication Data
US 2010/0106506 A1 Apr. 29, 2010

(51) Int. Cl.
*G10L 13/08* (2006.01)

(52) U.S. Cl.
USPC .......................................... 704/260; 704/258

(58) Field of Classification Search
USPC .................................. 704/258–269
See application file for complete search history.

(56) References Cited

U.S. PATENT DOCUMENTS

| | | | | | |
|---|---|---|---|---|---|
| 5,832,432 | A | * | 11/1998 | Trader et al. | 704/260 |
| 6,085,161 | A | * | 7/2000 | MacKenty et al. | 704/270 |
| 6,088,675 | A | * | 7/2000 | MacKenty et al. | 704/270 |
| 6,466,909 | B1 | * | 10/2002 | Didcock | 704/260 |
| 6,728,681 | B2 | * | 4/2004 | Whitham | 704/275 |
| 6,941,509 | B2 | * | 9/2005 | Harris | 715/201 |
| 2002/0077832 | A1 | * | 6/2002 | Leonid et al. | 704/276 |
| 2003/0023443 | A1 | * | 1/2003 | Shizuka et al. | 704/260 |
| 2005/0071165 | A1 | * | 3/2005 | Hofstader et al. | 704/270.1 |
| 2005/0197837 | A1 | * | 9/2005 | Suontausta et al. | 704/260 |
| 2006/0271366 | A1 | * | 11/2006 | Bruckman | 704/258 |
| 2008/0114599 | A1 | * | 5/2008 | Slotznick et al. | 704/260 |
| 2009/0018839 | A1 | * | 1/2009 | Cooper et al. | 704/260 |
| 2009/0157407 | A1 | * | 6/2009 | Yamabe et al. | 704/260 |
| 2009/0202226 | A1 | * | 8/2009 | McKay | 386/104 |
| 2009/0204243 | A1 | * | 8/2009 | Marwaha et al. | 700/94 |
| 2009/0254345 | A1 | * | 10/2009 | Fleizach et al. | 704/260 |

OTHER PUBLICATIONS

KNFB Mobile Reader, http://www.knfbreader.com/products-mobile.php, retrieved on Oct. 20, 2008.
B. Erol, et al., Multimedia Thumbnails for Documents, MM '06, pp. 231-240, 2006.
K. Vadas, et al., Reading on-the-go: a comparison of audio and hand-held displays, CHI '06, pp. 219-226, 2006.

* cited by examiner

*Primary Examiner* — Douglas Godbold
(74) *Attorney, Agent, or Firm* — Sughrue Mion, PLLC (57) ABSTRACT

A system for visually navigating a document in conjunction with a text-to-speech ("TTS) engine presents a visual display of a region of interest that is related to the text of the document that is being audibly presented as speech to a user. When the TTS engine converts the text to speech and presents the speech to the user, the system presents the corresponding section of text on a display. During the presentation, if the system encounters a linked section of text, the visual display changes to display a linked region of interest that corresponds to the linked section of text.

34 Claims, 5 Drawing Sheets

SYSTEMS AND METHODS FOR DOCUMENT NAVIGATION WITH A TEXT-TO-SPEECH ENGINE

BACKGROUND OF THE INVENTION

1. Field of the Invention

The present invention relates to systems and methods for document navigation with a text-to-speech engine, and more specifically to altering an image on a visual display based on the content of spoken text in a text-to-speech engine.

2. Background of the Invention

While there are several technologies being developed to help people browse, skim, and read documents on mobile devices, these applications require that users consume information displayed on an inevitably small screen. Using an auditory channel can allow users "to more easily and effectively process and navigate their environment by freeing up visual resources. Kristin Vadas, et al.; *Reading on-the-go: a comparison of audio and hand-held displays*; CHI 2006; pp. 219-226. While there are many audio-based applications designed to help people with visual disabilities interact with mobile devices, including automated screen reading and zooming features, little work has been done to support able-bodied users reading mobile documents that makes use of both visual and auditory channels.

Thus, it is desired to develop systems and methods for utilizing text-to-speech applications with a visual display to aid in a user's ability to comprehend a document in its complete context.

SUMMARY OF THE INVENTION

One aspect of the present invention relates to systems and methods for visually navigating a document in conjunction with a text-to-speech ("TTS") engine in order to present a visual display of a region of interest that is related to the text of the document that is being audibly presented to a user. When the TTS engine converts the text to speech and presents the speech to the user, the system presents the corresponding section of text on a display. During the presentation, if the system encounters a linked section of text, the visual display changes to display the linked region of interest that corresponds to the linked section of text.

Another aspect of the present invention relates to a system for document navigation comprising: a display module displaying a text document to a user; a text-to-speech ("TTS") engine converting the text of a document into at least one audible sound; an audio module presenting the at least one audible sound to the user; and a document navigation application displaying a section of the document corresponding to the audible sound, wherein upon displaying a section of the document containing a link which points to a region of interest, the document navigation application displays the region of interest pointed to by the link In another aspect of the invention, the system further comprises a linking module creating at least one link from at least one section of text in the document to at least one region of interest.

In a further aspect of the invention, the region of interest is within the document.

In yet another aspect of the invention, the region of interest is separate from the document.

In a still further aspect of the invention, the region of interest comprises a non-text object.

In another aspect of the invention, the region of interest comprises a section of text.

In a further aspect of the invention, the link comprises a hyperlink

In yet another aspect of the invention, the link comprises a macro.

In a still further aspect of the invention, the linking module uses a set of heuristics to determine sections of text to be linked with regions of interest.

In a further aspect of the invention, a notification module notifies the user if the TTS engine cannot accurately convert a section of the text of the document into speech.

In a still further aspect of the invention, a notification module that notifies the user when a region of interest has been completely loaded onto the display.

Another aspect of the present invention relates to methods for navigating a document while using a text-to-speech engine, the method comprising the steps of displaying a text document to a user; converting the text of the document into at least one audible sound using a text-to-speech ("TTS") engine; presenting the at least one audible sound to the user; and displaying a section of the document corresponding to the audible sound; wherein when a section of the document containing a link which points to a region of interest is displayed, further displaying the region of interest pointed to by the link In a further aspect of the invention, the method further comprises creating at least one link from at least one section of text in the document to at least one region of interest.

In a further aspect of the invention, the method further comprises selecting the region of interest from within the document.

In yet another aspect of the invention, the method further comprises selecting the region of interest from outside the document.

In a still further aspect of the invention, the method further comprises selecting a non-text object as the region of interest.

In another aspect of the invention, the method further comprises selecting a section of text as the region of interest.

In a further aspect of the invention, the method further comprises using a hyperlink to link the at least one section of text of a document to the at least one region of interest.

In yet another aspect of the invention, the method further comprises using a macro to link the at least one section of text of a document to the at least one region of interest.

In a still further aspect of the invention, the method further comprises using a set of heuristics to determine sections of text to be linked with regions of interest.

In a further aspect of the invention, the method further comprises notifying the user if the TTS engine cannot accurately convert a section of the text of the document into speech.

In yet another aspect of the invention, the method further comprises notifying the user when the link to a region of interest has been completely loaded onto the display.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description, reference will be made to the accompanying drawing(s), in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

One aspect of the present invention relates to systems and methods for visually navigating a document in conjunction with a text-to-speech ("TTS") engine in order to present a visual display of a region of interest that is related to the text of the document that is being audibly presented to a user. The system first scans the document and creates links from a section of text to a region of interest in another part of the document or even outside the document. When the TTS engine converts the text to speech and presents the speech to the user, the system presents the corresponding section of text on a display. During the presentation, if the system encounters a linked section of text, the visual display changes to display the linked region of interest that corresponds to the linked section of text.

The system described herein is an application tool that couples the visual display of a document with a TTS engine. In one embodiment, the tool automatically pans and zooms the visual display to regions-of-interest depending upon the content of the spoken text. For example, when the TTS engine is reading text in a document that states "as shown in FIG. 15," the visual display would automatically display FIG. 15 of the document. In this particular embodiment, then, FIG. 15 of the document is the region of interest. While this is most useful for document figures, any textual reference can be labeled as a region of interest and used to queue a change in the visual display, from footnotes to references to other sections, chapters, or appendices.

Furthermore, this technology can be applied to an array of document types, including digital documents, scanned documents, and web pages. In one aspect where the original document is scanned, the system converts the document to a digital text using, for example, known optical character recognition ("OCR) software. In addition to using references in the text to automatically pan and zoom to areas of a page, the technology can provide other services automatically, such as following links to web pages or initiating embedded macros.

Figure 1:
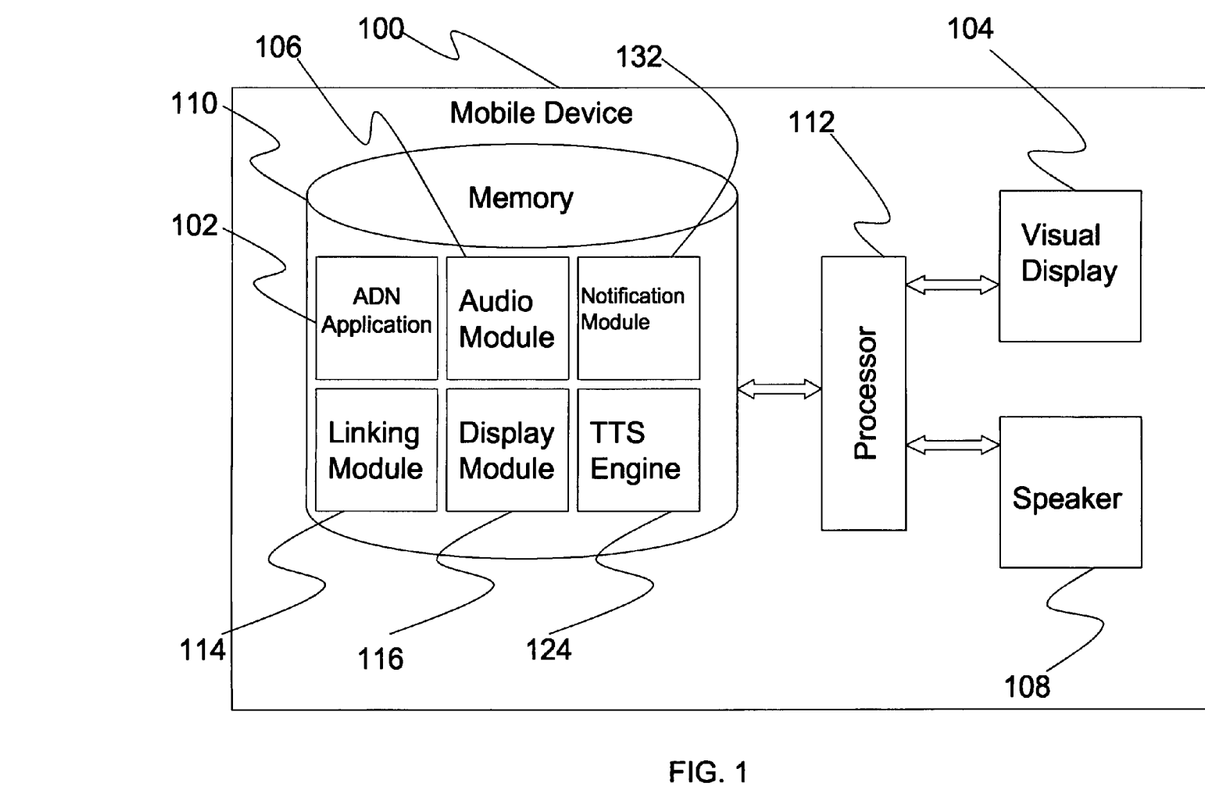
FIG. 1 depicts an overview of the system for visually navigating a document in conjunction with a text-to-speech ("TTS") engine, according to one embodiment of the invention.

In one embodiment of the inventive concept depicted in FIG. 1, the inventive system includes a document navigation application 102 installed on a mobile device 100 with a display 104, such as a mobile phone or laptop, and an audio module 106, such as a speaker 108 in the phone or a headphone connected to the mobile device 100. In one embodiment, the application 102 will reside on the memory 110 of the mobile device 100, which further includes a processor 112 to run the application 102 from the memory. Alternate embodiments are discussed below with regard to FIGS. 4 and 5. Given a document, a linking module 114 also resident within the memory first links at least one section of text in the document to a region of interest outside the at least one section of text. For example, the linking module 114 may identify particular phrases, such as "as shown in FIG. 15, to link to the actual FIG. 15 being referred to, whether the figure is in the same document or in another document.

An algorithm running in the linking module 114 uses a variety of methods to determine where to create links in the document. In one embodiment, the links are those that are already embedded in many digital documents, such as hyperlinks or macros. If the links are embedded in the document itself, such as hyperlinks to web documents, the linking module 114 is not necessary unless additional links are desired. If additional links are desired, the algorithm may rely on a set of heuristics. In another embodiment where links are not embedded, the linking module 114 would need to make two passes through the document: first to extract relevant regions of interest, and then to link text to the regions of interest. There are at least three different types of regions of interest: 1) figures and tables, 2) sections, and 3) citations, which are discussed separately below.

For figures and tables, in the first pass through the document, the linking module 114 can segment out figures and tables and discover their corresponding captions (by, for example, looking for proximate text regions that have a slightly different font size than the body text). Then in the second pass, the linking module 114 can search for n-grams from the caption to link to segments of body text (likely 2-grams, since most of the time it would be looking for something like "FIG. 2").

For sections, the linking module 114 needs to identify section headings in the first pass and again search and link to segments of body text in the second pass. Section header identification could again be accomplished using, in one embodiment, font size estimation.

For citations, the linking module 114 needs to identify citations and the reference section in the first pass. Citations could be identified via some simple regular expression searches in the body text (for example, "[\d+] for most scientific papers, which finds a string of one or more digits that have been bracketed). The reference section could be identified by using section identification techniques described above and matching likely text ("references", "citations", or "bibliography" being more common words).

In one non-limiting example, when referencing section headers, the algorithm need only take into consideration font size and lettering. For scanned documents, the algorithm relies on pre-processed segmentation to distinguish caption text from body text, as described in *Content Based Automatic Zooming: Viewing Documents on Small Displays*; Patrick Chiu, Koichi Fujii, Qiong Liu; to appear in the Proceedings of ACM Multimedia 2008.

In an alternative embodiment, the linking module 114 is located on an external server (not shown), in which case the document navigation application 102 would download the document and links from the server once the linking module 114 has created the links.

Figures 2A, 2B:
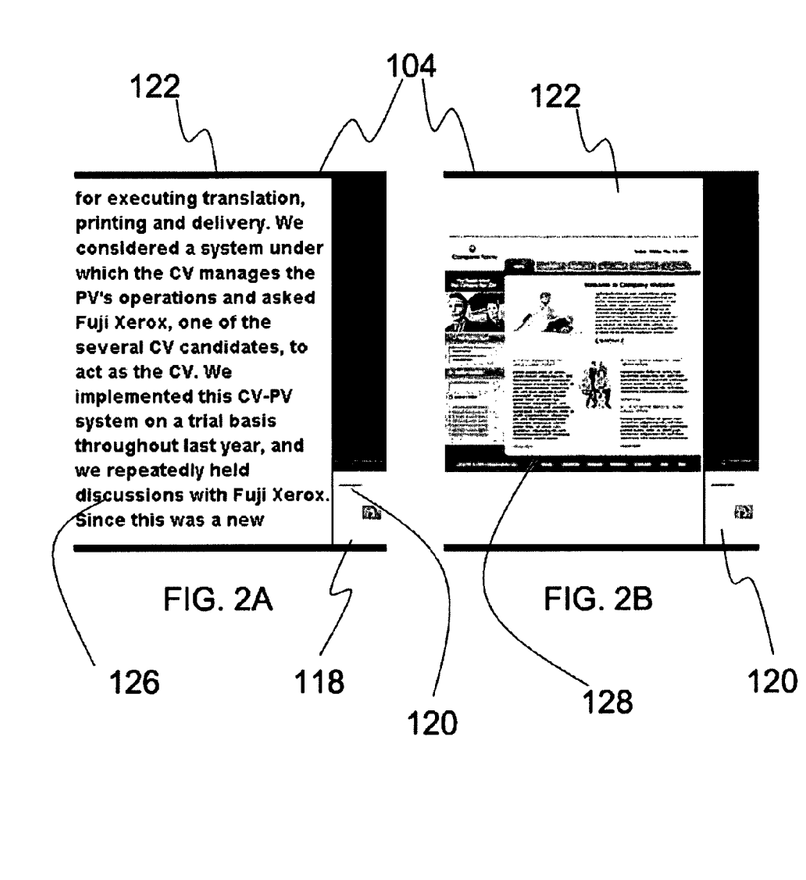
FIGS. 2A-2C depict an illustration of a visual display as a document navigation application identifies a linked section of text and alters the display to display a linked region of interest, according to one embodiment of the invention.

The TTS engine 124 converts the text of the document into an audible sound so that the user will hear the speech that is representative of the text in the document. An audio module 106, such as the speaker 108 on the mobile device, presents the audible sounds to the user. In an alternative embodiment, the TTS engine 124 is located on an external server (not shown), in which case the document navigation application 102 would download an audio stream of the document after the TTS engine 124 has converted it to audio. The document navigation application 102 takes the audio signal from the TTS engine 124 and synchronizes it so that the relevant portion of text from the document is displayed on the display 104 when the speech from the same section is being audibly presented to the user. In one embodiment, a display module 116 presents an interface on the display 104. One embodiment of the display interface is illustrated in FIG. 2A, depicting both a document overview 118 with a current cursor location 120 marked and, in the main frame 122, the visual information most relevant to the text proximate to the cursor location 120. In lieu of any linked text, the document navigation application 102 simply presents an appropriately zoomed region surrounding the cursor 120 in the main view, using the content-based automatic zooming ("CBAZ") referenced in Chiu, et. al, and illustrated in FIG. 2A. One embodiment of a TTS engine is the NeoSpeech™ VoiceText™ TTS Software, available at www.neospeech.com (last accessed Oct. 20, 2008) (NeoSpeech™, Inc., Sunnyvale, Calif.). When the document navigation application 102 encounters a linked phrase, the document navigation application 102 causes the display to automatically pan and zoom to the linked region of interest for some pre-specified time. As depicted specifically in FIG. 2A, the document navigation application 102 adjusts the main view 122 of the visual display as it moves between linked regions in a document. Initially, with no linked regions of interest, the display shows only text 126 in the main view 122. The document navigation application 102 then encounters a link (not shown) to a web page 128 in FIG. 2B and a link to a FIG. 130 in FIG. 2C. The document navigation application 102 then adjusts the main view 122 accordingly to display the respective linked regions of interest. Note also that as the audio signal from the TTS engine 124 presents the speech of the document, the cursor location 120 is updated on the overview display 118 in the lower right.

In another embodiment, the user can press a button to stop and start the audio signal of the text. Also at any time, the user can directly manipulate the main view 122, either to view a different part of the document or to change the cursor location 120 (different gestures distinguish the two actions). In the former case, the system would reset the main view after a timeout in user interactivity.

Figure 3:
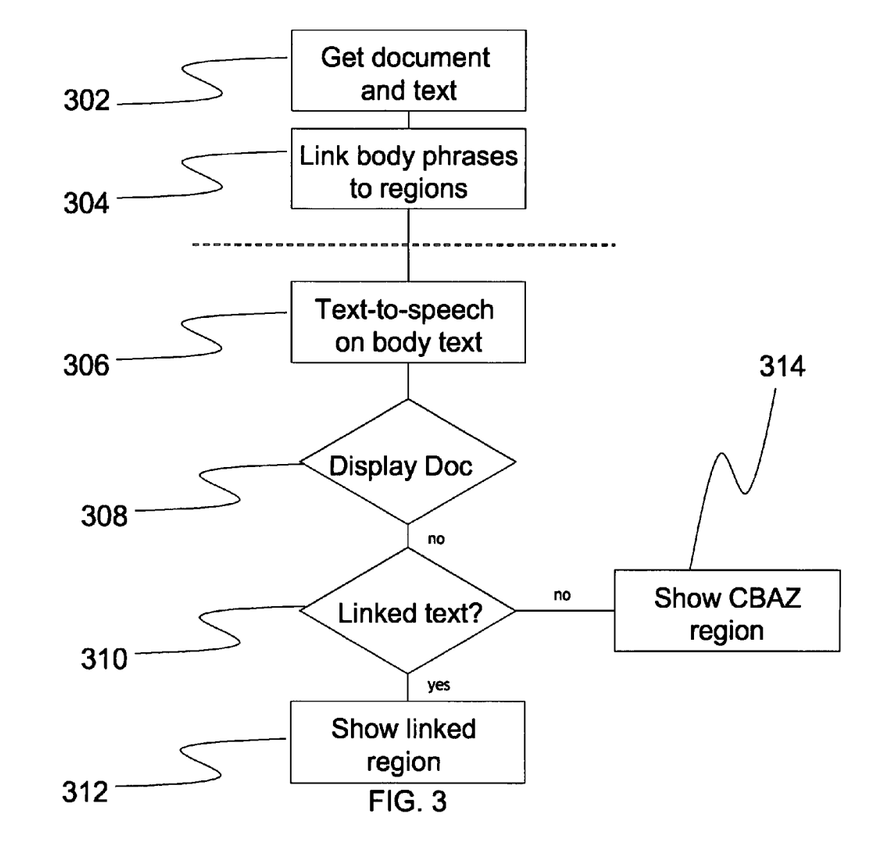
FIG. 3 depicts a method for visually navigating the document in conjunction with the TTS engine, according to one embodiment of the invention.

One embodiment of a method of visually navigating a document in conjunction with using a TTS engine is illustrated in FIG. 3. In a first step 302, a document with text is obtained for conversion using the TTS engine. Next, in step 304, the linking module then processes the document to link sections of text, such as phrases and words, with appropriate regions of interest. In step 306, the TTS engine converts the text to speech and presents the audible sounds to the user using the audio module. In step 308, the document navigation application displays the linked document to the user on the display, with the particular section of the document being displayed corresponding to the section of speech being audibly presented to the user, using CBAZ. The user may exercise control over the document navigation application by stopping and starting the presentation of the audible speech at will, or by changing the cursor position in the document so that the segment of the audio signal being presented will also change. In step 310, the document navigation application may encounter linked text, in which case the visual display will change, in step 312, to show the linked region of interest on the main view. If no linked text is encountered, as in step 314, the main text view will continue to be presented.

In a further embodiment, the system incorporates a notification module 132, as shown in FIG. 1, to interleave useful information into an audio stream that is being presented to the user. For example, for scanned documents, a known OCR tool converts the scanned text to digital text and additionally reports the recognition accuracy. The notification module 132 can then identify sections where the accuracy is too low and place an annotation into the digital text of the document to indicate in the audio stream (with a short blip or explanation) when recognition errors would likely make text-to-speech translation unusable. The notification module 132 would receive an indication from the linking module 114 as to whether a particular section of text is unreadable, in which case the notification module 132 would interject a notification into the audio stream created by the TTS engine 124. These indications can be presented in advance to allow users to avoid listening to garbled speech and turn their attention instead to the visual display in order to read the corresponding text. Other audio interjections might indicate the status of the visual display.

Figure 2C:
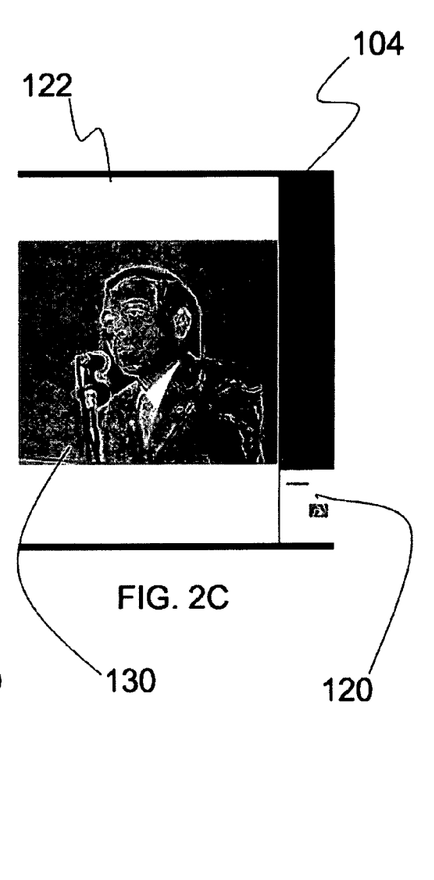

It should be noted that the system described herein can be used with other state-of-the-art technologies to assist document perusal. For example, in one embodiment, a user can interact with the display 104 to change the cursor position 120. An overview display 118 can be coupled with the main viewport 122 so that users always know the current cursor position 120 in the document, as shown in FIGS. 2A-2C.

Figure 4:
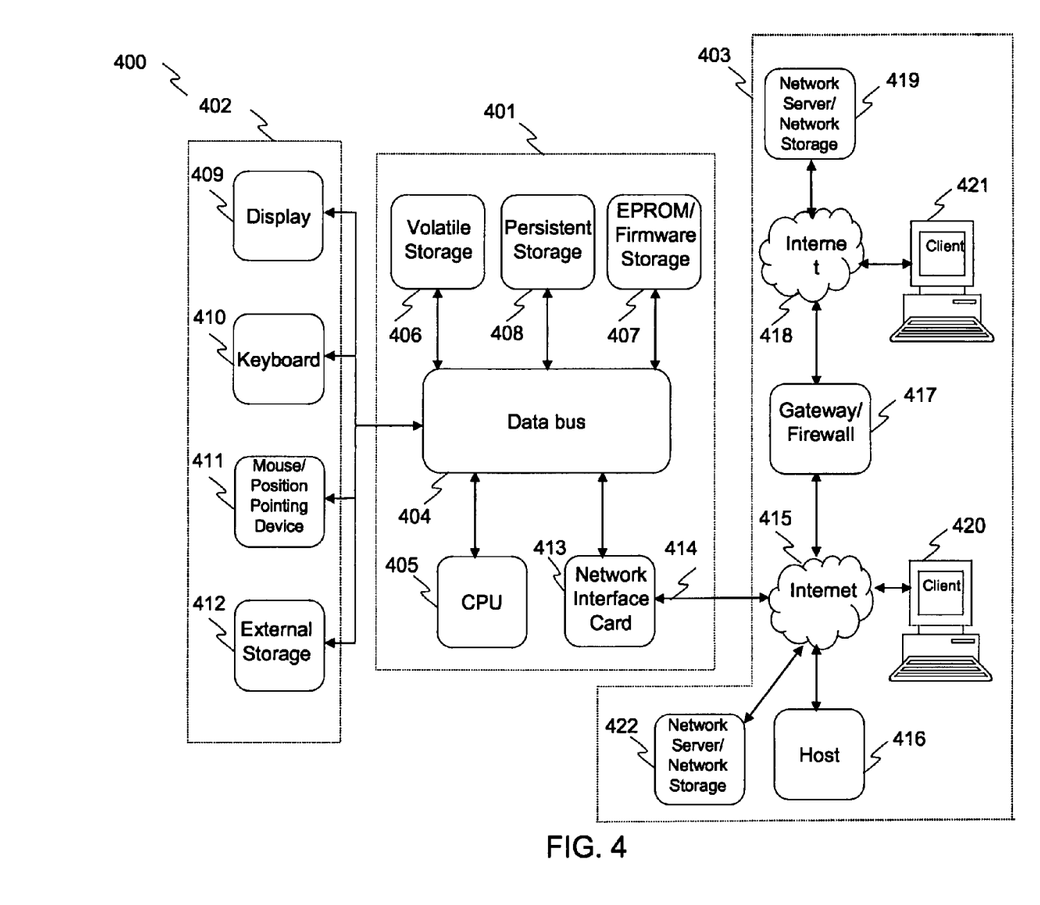
FIG. 4 illustrates an exemplary embodiment of a computer platform upon which the inventive system may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403.

The computer platform 401 may include a data bus 404 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 404 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 404 for storing static information and instructions for processor 405, such as basic input-output system (BIOS), as well as various system configuration parameters.

A persistent storage device 408, such as a magnetic disk, optical disk, or solid-state flash memory device is provided and coupled to bus 401 for storing information and instructions.

Computer platform 401 may be coupled via bus 404 to a display 409, such as a cathode ray tube (CRT), plasma display, or a liquid crystal display (LCD), for displaying information to a system administrator or user of the computer platform 401. An input device 420, including alphanumeric and other keys, is coupled to bus 401 for communicating information and command selections to processor 405. Another type of user input device is cursor control device 411, such as a mouse, a trackball, or cursor direction keys for communicating direction information and command selections to processor 404 and for controlling cursor movement on display 409. This input device typically has two degrees of freedom in two axes, a first axis (e.g., x) and a second axis (e.g., y), that allows the device to specify positions in a plane.

An external storage device 412 may be connected to the computer platform 401 via bus 404 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive system may reside on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 408. Volatile media includes dynamic memory, such as volatile storage 406. Transmission media includes coaxial cables, copper wire and fiber optics, including the wires that comprise data bus 404.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on the data bus 404. The bus 404 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 404. Communication interface 413 provides a two-way data communication coupling to a network link 414 that is connected to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 414 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 414 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 414 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution. In this manner, computer system 401 may obtain application code in the form of a carrier wave.

Figure 5:
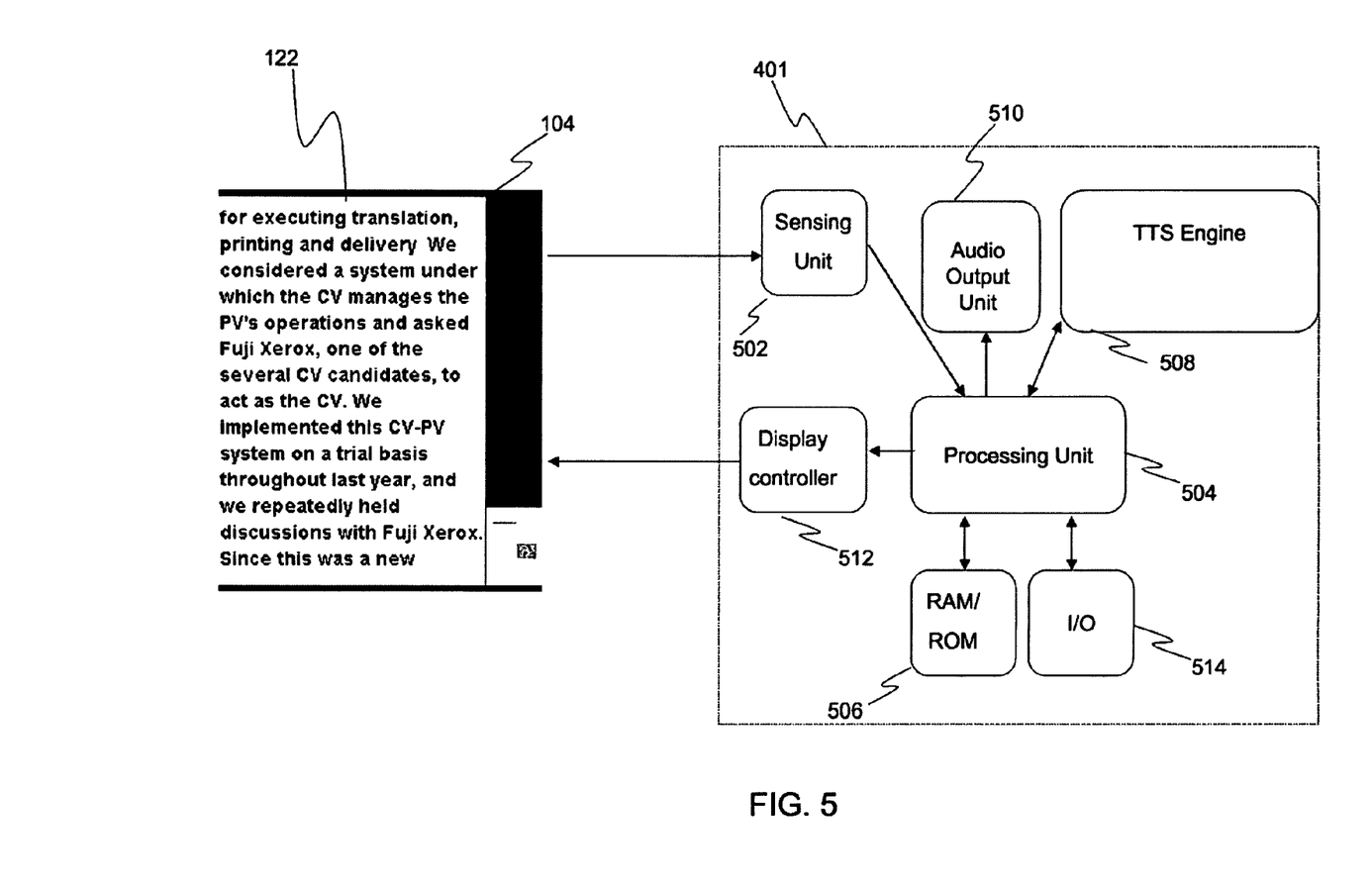
FIG. 5 illustrates one embodiment of a functional diagram illustrating how the system for visually navigating a document with a TTS engine relates to the computer platform.

FIG. 5 illustrates how the computer platform 401 relates to the system for visually navigating a document in conjunction with a text-to-speech ("TTS) engine. Here, FIG. 5 illustrates the main frame 122 of the display 104 described in FIG. 2A. When input information is given through the display 104, a sensing unit 502 senses the input and forwards it to the processing unit 504. The processing unit 504, in conjunction with the document navigation application stored on the connected RAM or ROM 506, then processes the information and interprets the command that the user had inputted through the display 104. For example, if the user inputted a command to activate the zoomed region embodiment, the processing unit 504 will convert the document text into audible sound through the use of the TTS engine 508 and forward it to the audio output unit 510, which then proceeds to output the converted audio sound for the user. As the audio is being outputted, the processing unit 504 will also forward instructions to the display controller 512 to adjust the main frame 122 of the visual display 104 as the cursor moves between linked regions in a document. Other embodiments of the invention are also possible through this example computer platform. Furthermore, the computer platform is not limited to receiving commands through the display; other I/O devices 514 as previously described may be attached to the computer platform for inputting commands for the processing unit.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the system and method for document navigation with a text-to-speech engine. For example, the described software may be implemented in a wide variety of programming or scripting languages, such as Assembler, C/C++, perl, shell, PHP, Java, etc.

Although various representative embodiments of this invention have been described above with a certain degree of particularity, those skilled in the art could make numerous alterations to the disclosed embodiments without departing from the spirit or scope of the inventive subject matter set forth in the specification and claims. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. Also, various aspects and/or components of the described embodiments may be used singly or in any combination in the document display and navigation system. It is intended that all matter contained in the above description or shown in the accompanying drawings shall be interpreted as illustrative only and not limiting.

What is claimed is:

1. A system for document navigation, comprising:
    a display;
    a display module displaying a text document on the display;
    a text-to-speech ("TTS") engine converting a text of the text document into at least one audible sound;
    an audio module presenting the at least one audible sound; and
    a document navigation application displaying a section of the text document corresponding to the audible sound and navigating a displayed cursor indicating the text corresponding to the at least one audible sound as the at least one audible sound is played,
    wherein upon displaying the section of the document containing a link which points to a region of interest, the document navigation application pans to the region of interest pointed to by the link, when the link is referenced by the audible sound.

2. The system of claim 1, further comprising a linking module creating at least one link from at least one section of the text in the document to the region of interest.

3. The system of claim 2, wherein the linking module uses a set of heuristics to determine sections of the text to link with the region of interest.

4. The system of claim 1, wherein the region of interest is within the document.

5. The system of claim 1, wherein the region of interest is separate from the document.

6. The system of claim 1, wherein the region of interest comprises a non-text object.

7. The system of claim 1, wherein the region of interest comprises a section of the text.

8. The system of claim 1, wherein the link comprises a hyperlink.

9. The system of claim 1, wherein the link comprises a macro.

10. The system of claim 1, further comprising a notification module that provides a notification if the TTS engine cannot convert a section of the text of the document into the at least one audible sound.

11. The system of claim 1, further comprising a notification module that provides a notification when a region of interest has been loaded onto the display module.

12. A method for navigating a document while using a text-to-speech engine, the method comprising the steps of:
    displaying a text document;
    converting a text of the text document into at least one audible sound using a text-to-speech ("TTS") engine;
    presenting the at least one audible sound;
    displaying a section of the document corresponding to the audible sound; and
    navigating a displayed cursor indicating the text corresponding to the at least one audible sound as the at least one audible sound is played;
    wherein when the section of the document containing a link which points to a region of interest is displayed, further panning to the region of interest pointed to by the link when the link is referenced by the audible sound.

13. The method of claim 12, further comprising creating at least one link from at least one section of the text in the document to the region of interest.

14. The method of claim 13, further comprising using a set of heuristics to determine sections of the text to be linked with the region of interest.

15. The method of claim 14, wherein the using the set of heuristics comprises determining textual references in the text of the document to other portions of the document.

16. The method of claim 12, further comprising selecting the region of interest from within the document.

17. The method of claim 12, further comprising selecting the region of interest from outside the document.

18. The method of claim 12, further comprising selecting a non-text object as the region of interest.

19. The method of claim 12, further comprising selecting a section of the text as the region of interest.

20. The method of claim 12, further comprising using a hyperlink to link the at least one section of the text document to the at least one region of interest.

21. The method of claim 12, further comprising using a macro to link the at least one section of the text document to the at least one region of interest.

22. The method of claim 12, further comprising providing a notification if the TTS engine cannot convert a section of the text of the document into the at least one audible sound.

23. The method of claim 12, further comprising providing a notification when the link to a region of interest has been loaded onto the display module.

24. A non-transitory computer readable medium comprising instructions for executing a process for document navigation, the instructions comprising:
- displaying a text document on a display;
- converting a text of the text document into at least one audible sound;
- presenting the at least one audible sound;
- displaying a section of the document corresponding to the audible sound, and
- navigating a displayed cursor indicating text corresponding to the at least one audible sound as the at least one audible sound is played;
- wherein upon displaying the section of the document containing a link which points to a region of interest, panning to the region of interest pointed to by the link when the link is referenced by the audible sound.

25. The non-transitory computer readable medium of claim 24, wherein the instructions further comprise creating at least one link from at least one section of the text in the document to the region of interest.

26. The non-transitory computer readable medium of claim 25, wherein the instructions further comprise using a set of heuristics to determine sections of the text to link with the region of interest.

27. The non-transitory computer readable medium of claim 24, wherein the region of interest is within the document.

28. The non-transitory computer readable medium of claim 27, wherein the region of interest is separate from the document.

29. The non-transitory computer readable medium of claim 24, wherein the region of interest comprises a non-text object.

30. The non-transitory computer readable medium of claim 24, wherein the region of interest comprises a section of the text.

31. The non-transitory computer readable medium of claim 24, wherein the link comprises a hyperlink.

32. The non-transitory computer readable medium of claim 24, wherein the link comprises a macro.

33. The non-transitory computer readable medium of claim 24, wherein the instructions further comprise providing a notification if a Text to Speech (TTS) engine cannot convert a section of the text of the document into the at least one audible sound.

34. The non-transitory computer readable medium of claim 24, wherein the instructions further comprise providing a notification when a region of interest has been loaded.

\* \* \* \* \*